(12) United States Patent
Forbes et al.

(10) Patent No.: US 8,650,009 B2
(45) Date of Patent: Feb. 11, 2014

(54) SENSOR VALIDATION AND VALUE REPLACEMENT FOR CONTINUOUS EMISSIONS MONITORING

(75) Inventors: William Butler Forbes, Austin, TX (US); Michael Eugene Sugars, Elgin, TX (US); Walter Edgar Hayes, IV, Carl Junction, MO (US); Eugene Boe, Austin, TX (US); Scott Lawrence Jost, Austin, TX (US); Richard Andrew Hovan, Leander, TX (US); Keith Alex Smith, Leander, TX (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 203 days.

(21) Appl. No.: 12/872,318

(22) Filed: Aug. 31, 2010

(65) Prior Publication Data

US 2012/0053909 A1 Mar. 1, 2012

(51) Int. Cl.
*G06F 17/10* (2006.01)

(52) U.S. Cl.
USPC .......................................................... 703/2

(58) Field of Classification Search
USPC ....................................................... 703/6, 2
See application file for complete search history.

(56) References Cited

U.S. PATENT DOCUMENTS 5,386,373 A 1/1995 Keeler et al.

OTHER PUBLICATIONS

Frost & Sullivan Press Release; Frost & Sullivan Recognizes Pavilion Technologies for Innovation in the Air Emission Control and Monitoring Market; pp. 1-2; Jul. 2009.*
Epa report: Alternative Monitoring Protocol Predictive Emission Monitoring System to Determine NO and CO Emissions x From an Industrial Furnace; pp. 1-12. 1998. Obtained from http://www.epa.gov/ttn/emc/cem /furnace.pdf.*
Hovan: NACAA-ICI Boiler MACT, Pretense for New and Innovative Technologies (MARAMA and ICAC Advances in Control Technology Workshop Jul. 9-10, 2008), obtained from ww.epa.gov/apti/video/Hovan1__files/intro.htm; pp. 1-12; 1998.*
Chien et al.; A performance study of PEMS applied to the Hsinta power station of Taipower; Atmospheric Environment 39 (2005) pp. 223-230.*
US EPA (2006): Re Approval of the Predictive Emission Monitoring System Installed on Unit GT2100 at Dearborn Industrial Generation (Facility ID (ORISPL) 55088). pp. 1-24.*
WO 95/04957; Feb. 1995; US; Keeler; B01D53/34.*
Federal Register; "Performance Specification 16 for Predictive Emissions Monitoring SYstems and Amendment to Testing and Monitoring Provisions"; Rules and Regulations, vol. 74, No. 56, Mar. 25, 2009, pp. 1-17.

* cited by examiner

*Primary Examiner* — Hugh Jones
(74) *Attorney, Agent, or Firm* — Fletcher Yoder, P.C.; William R. Walbrun; John M. Miller

(57) ABSTRACT

A continuous emissions model system is described that employs an emissions model that can determine emissions values from a plant for use in place of sensed emission data in the event of failure or lack of communication from a sensor. The emissions model itself receives inputs that may be based upon sensed data. Each emissions model input may be substituted with a modeled input. The modeled inputs, as well as the emissions model outputs maybe biased to render them more accurate. If any one of the emissions model inputs fails (e.g., becomes unavailable or is clearly erroneous), the corresponding modeled input may be utilized so long as the modeled input passes an acceptability test.

18 Claims, 3 Drawing Sheets

SENSOR VALIDATION AND VALUE REPLACEMENT FOR CONTINUOUS EMISSIONS MONITORING

BACKGROUND

The present invention relates generally to the field of continuous emissions monitoring systems (CEMS), and particularly to the validation of sensor readings in replacement of sensor values for calculations of emissions in such systems.

Emissions monitoring systems are common and necessary components of modern industrial and other plants, particularly manufacturing plants, power generating plants, and so forth. For almost 20 years software CEMS have been successfully deployed to detect and predict emissions in such industrial plants, including emissions of boilers, furnaces, gas turbines, thermal oxidizers and other combustion sources, in the United States and around the world. One such successful software CEMS is commercially available from Rockwell Software, a division of Rockwell Automation, Inc. of Milwaukee, Wis. under the commercial designation "software CEM." Such systems allow for progressive software-based solutions for emissions compliance requirements. In conjunction with other products, they may afford environmental compliance and reporting, providing "active compliance" continuously and in real-time as a predictive emissions monitoring system (PEMS), increasing product integrity and optimizing energy efficiency.

In certain CEMS, sensor data is generated that is representative of the emission of certain components of interest, typically in gaseous form, although other forms may be detected. The systems may allow for monitoring and modeling of such emissions, such that if an emissions sensor is non-communicative or produces a clearly erroneous result, a modeled value may serve as a surrogate for the sensed value. Models may also be developed for the inputs to the emissions model. Such functionality would typically be provided in a PEMS architecture.

Most recently, in 2009 the U.S. Environment Protection Agency finalized new standards for the acceptability of certain classes of PEMS when they are initially installed. The standard, now known as Performance Specification 16 (PS-16), includes a number of refined requirements, including one relating to a Sensor Evaluation System, in Section 6.1.8 of the Standards. The subject section states that a compliant PEMS must be designed to perform automatic or manual determination of defective sensors on at least a daily basis. Moreover, Section 6.1.2 of the Standards states a requirement that a compliant PEMS must operate within the range of minimum and maximum values (an "operating envelope") of the data from the PEMS development process. In general, the PEMS development process is the process used to develop the predictive model. In many cases these values constitute the values for a training dataset used for emissions model input variables.

In known PEMS products with sensor validation methods input values to the emissions model that fall outside of an operating envelope may be used as an indication of sensor drift. In such cases, conventional systems may substitute a reconstructed value for the sensor value, which by definition would fall within the operating envelope, the substituted value being based upon the model training dataset. However, such prior techniques may not be fully consistent with the intent of PS-16 insomuch as they allow sensor readings that fall outside the operating envelope to be replaced with reconstructed values that are within the envelope.

There is a need, therefore, for improved CEM systems and techniques that can respond to the evolving requirements, particularly regarding the replacement of modeled or reconstructed values for sensed values as inputs to an emissions model.

BRIEF DESCRIPTION

The present invention provides a novel approach to emissions monitoring, and particularly to PEMs methodologies designed to respond to such needs. In accordance with one aspect of the invention, a predictive emissions monitoring method comprises utilizing an emissions prediction model that determines an emission level of a material transformation process based upon an input value or a modeled input value in place of the input value, evaluating the effect of replacement of the input value by the modeled input value on an estimate of the emission level. The method then determines whether the input value is in need of replacement. If the input value is in need of replacement and the effect of replacement of the input value by the modeled input value is acceptable, the emission level is computed via the emissions prediction model based upon the modeled input value.

The invention also provides a method that comprises utilizing an emissions prediction model that determines an emission level of a material transformation process based upon a plurality of input values or a modeled input value in place of a respective one of the input values, evaluating an effect of replacement of each of the input values by the respective modeled input value on an estimate of the emission level. The method then determines whether one of the input values is in need of replacement. If the determined input value is in need of replacement and the effect of replacement of the determined input value by the respective modeled input value is acceptable, the emission level is computed via the emissions prediction model based upon the modeled input value.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
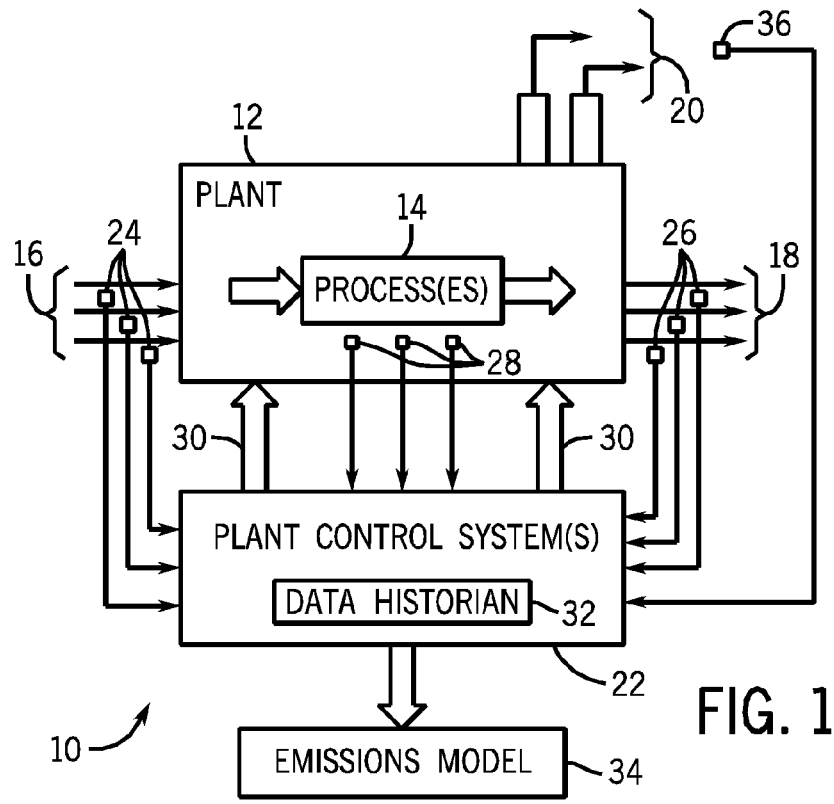
FIG. 1 is a diagrammatical representation of a physical plant carrying out one or more processes that produce emissions that are monitored and modeled in accordance with aspects of the present techniques.

FIG. 1 is a diagrammatical representation of an exemplary CEM system that monitors emissions from a plant 12. The plant may be any desired factory, vehicle, installation, and so forth that produces emissions that are to be monitored. By way of example only, such plants may include boilers, furnaces, gas turbines, thermal oxidizers, and other combustion sources, as well as plastics and other materials manufacturing and processing installations, various types of power plants, and so forth. In general, such plants employ one or more processes as indicated generally by reference numeral 14 to convert or transform material from one form to another. Such processes may include, but are certainly not limited to, combustion, various other chemical and material reactions and transformations, assembly processes, molding processes, material handling processes, and so forth. The processes perform the transformation based upon inputs 16 which may be considered the raw or semi-raw materials that feed the processes. The processes then perform the transformations and produce desired outputs 18, which may be in the form of manufactured goods, energy, by-products, waste products, and so forth. In performing the transformations, the processes 14 also produce emissions as indicated by reference numeral 20. In many cases, the emissions may include gasses, air or gas-borne particulate products, and so forth. Such emissions may also be in the form of liquid, semi-liquid, and even solid products, however.

The plant 12, and particularly the processes 14, are carried out under the control of one or more control systems as indicated generally by the plant control system 22 in FIG. 1. As will be apparent to those skilled in the art, such plant control systems may include one or more separate or integrated controllers that carry out logical functions with and without manual intervention for regulating the processes on an ongoing basis. The processes may be batch processes, continuous processes, or a combination of those, depending upon the nature of the transformation. Many such plant control systems may be implemented and are currently known, such as those available from Rockwell Automation, Inc., of Milwaukee, Wis. In general, the plant control systems 22 receive sensor data as indicated by reference numerals 24, 26 and 28. The sensor data may relate to input parameters 16, such as flow rates, product inputs, power inputs, and so forth, or to outputs 18, such as, again, flow rates, product quantities, characteristics of outputs 18, as well as to internal parameters as indicated by sensors 28. Such process or plant internal parameters may include such information as flow rates of particular product streams, temperatures, pressures, chemical compositions, moisture levels, and so forth. Again, as will be appreciated by those skilled in the art, the particular sensed parameters will vary, largely dependent upon the nature of the transformations performed by the processes, the type of control carried out, and the degree of automation of the processes.

Based upon such inputs, the plant control system provides inputs 30 to the plant to regulate the processes. Such regulation will typically include control of electric motors, control of valves, and other actuators used to regulate the processes to produce the outputs and to control the emissions. Moreover, the plant control system will typically include some form of data historian 32 which may be embodied in one or more computers or computer memories. The data historian may be used to store raw, semi-processed and processed data including sensor values, modeled values, emissions calculations, and so forth. In particular, the data historian 32 may be used to store values that service the basis for establishing the emissions model and prediction model inputs discussed below.

The system of FIG. 1 further includes an emissions model 34. The emissions model may be an integrated or add-on software component embodied in one or more appropriately programmed computers. In general, the emissions model is adapted for the particular process or processes carried out in the plant. The emissions model may be established based upon a first principles modeling scheme, a parametric modeling scheme, a neural network scheme, or any desired modeling technique. The model is capable of calculating the emissions from the plant, including one or more emissions components based upon input values that may be measured and/or calculated. In general, the emissions model 34 may take the form of a PEMS type model that may conform with PS-16. The emissions model itself may be of a generally known type, and may be established in accordance with known techniques, such as those set forth in referred to in U.S. Pat. No. 5,386,373 issued to Keeler et al. on Jan. 24, 1995, which is hereby incorporated into the present disclosure by reference.

The emissions model 34 may produce modeled values that may be compared to measured values from one or more emissions sensors 36 associated with emissions stream 20. As set forth in the patent referenced above, these actual measurements may be compared to predicted emissions values and use to determine whether the sensor values are reliable, whether modeled values are reliable, and so forth. Moreover, as discussed in greater detail below, the present technique allows for modeling of certain inputs to the emissions model and the substitution of a modeled or reconstructed input value should one or more measured values from one or more sensors that normally provide such inputs be determined to be unavailable, unreliable, and so forth.

Figure 2:
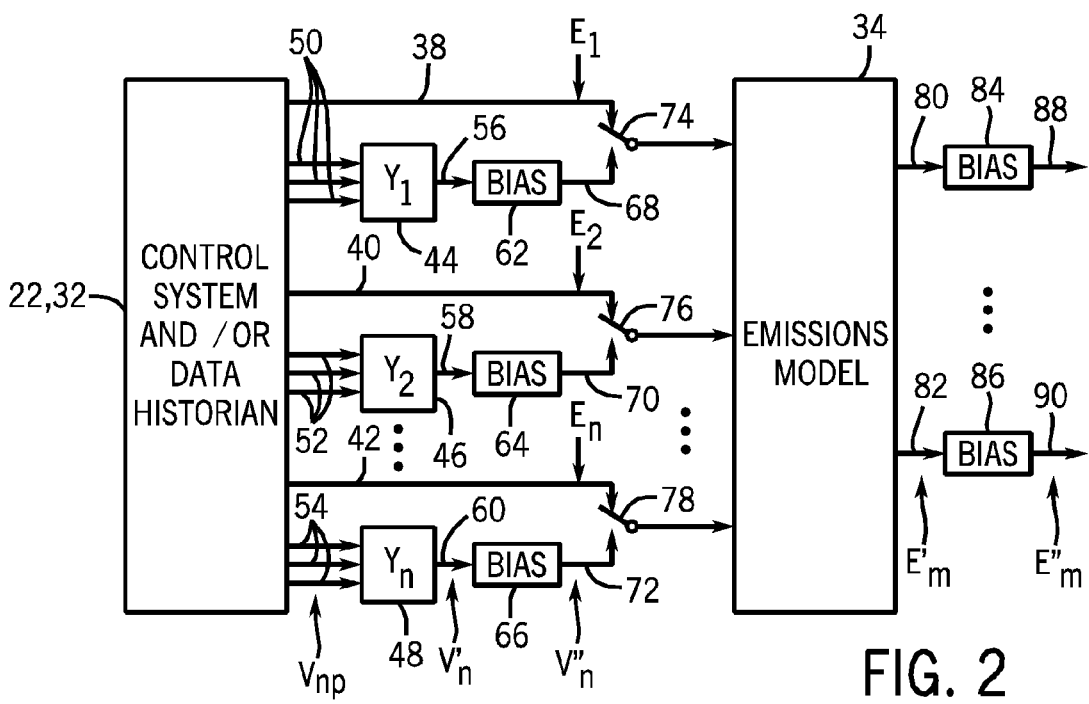
FIG. 2 is diagrammatical representation of the generation of input signals for an emissions model and the replacement of such input signals where desired, also in accordance with aspects of the present techniques.

FIG. 2 is a diagrammatical illustration of exemplary inputs to the emissions model 34 including measured and modeled inputs in accordance with aspects of the present techniques. As shown in FIG. 2, the emissions model 34 may receive one or more emissions model inputs 38, 40 and 42. These inputs will be used by the emissions model 34 to compute one or more emissions outputs. By way of example, the emissions model may receive as inputs such parameters as fuel flow, flue gas recirculation flow and stack $O_2$, to produce outputs indicative of $NO_x$ and $O_2$. Many different and other calculations may be made by the emissions model depending upon the processes carried out in the plant and the particular emissions of interest. The values of the inputs 38, 40 and 42 may be based upon actual, current, historical or modeled data, but in a real-time implementation, will typically be derived from actual sensed values from the sensors that are part of the instrumentation of the plant.

In parallel with one or more of these emissions model inputs, input prediction models 44, 46 and 48 are provided. In the illustrated embodiment, each emissions model input includes a parallel input prediction model, although in practice not all such inputs may be modeled. The input prediction models allow for modeling of the particular input parameter that is provided based upon sensed or computed data. As will be appreciated by those skilled in the art, the input prediction models themselves are fed various inputs to carry out a secondary modeling process. The inputs, indicated by reference numerals 50, 52 and 54 for the models 44, 46 and 48, respectively, will depend upon the particular modeling operation performed by the input prediction models. In the illustrated example, three input prediction models are provided, numbered from 1 to n, although one or more such models may be provided in a particular application. Similarly, each of these models is provided with inputs which may be denoted $V_{np}$, such that for any input prediction model, from 1 to p such input parameters may be provided. These parameters themselves will typically be sensed, derived from sensed data, or themselves modeled.

Based upon their modeling algorithms, then, the input prediction models 44, 46 and 48 produce outputs 56, 58 and 60, respectively. These outputs will essentially be identical in nature to the emissions model inputs 38, 40 and 42. That is, the outputs 56, 58 and 60 are dimensioned or dimensionless quantities essentially similar to the emissions model inputs, and that may be substituted for the emissions model inputs as described more fully below.

In the illustrated embodiment, a correction or bias may be made to each of these input prediction model outputs as indicated by reference numerals 62, 64 and 66. As described more fully below, these corrections or biases may be made to more appropriately align the model outputs with sensed versions of the similar process parameter as provided by the appropriate sensor, or as derived from sensor values. The biased emissions prediction model inputs, then, are provided as indicated by reference numerals 68, 70 and 72. These values are available to replace any one of the respective emissions prediction model inputs 38, 40 and 42, as indicated by reference numerals 74, 76 and 78. As will be appreciated by those skilled in the art, the diagrammatical "switch" shown in FIG. 2 will most commonly be provided by a software or firmware decision block in which the emissions prediction model input 38, 40 or 42 could be used for the emissions model 34, or its corresponding surrogate, the modeled or reconstructed value 68, 70 or 72, respectively, could be used.

The emissions model 34 thus produces one or more outputs representative of an emission level of one or more components of interest based upon one or more inputs. Again, these inputs may be the actual emissions prediction model input 38, 40 and 42, or may be a surrogate value 68, 70 or 72. The emissions model outputs, indicated by reference numerals 80 and 82 in FIG. 2 may themselves be corrected or biased as indicated by reference numerals 84 and 86 in FIG. 2. The outputs of the emissions model, which may include as few as 1 and as many as m, may thus be transformed into biased emissions model outputs 88 and 90. These values will typically be reported, recorded, and used to notify operations personnel of current emissions levels.

The modeling and reporting process summarized in FIG. 2 is preferably carried out on an ongoing or continuous basis, with computer code driving the process being stored in the plant control systems or the emissions model computer. It should be noted that parallel determination of emissions levels may be performed by multiple computers. Code for carrying out these processes will typically be stored in memory for these one or more computers and the code will allow for the model as set forth above to be stored, executed, and for reports to be made, notices to be provided to operators, and so forth. The code will also allow for decision making regarding whether or not use one or more of the surrogate values rather than an emissions prediction model input as discussed above and as covered more fully below.

Figure 3:
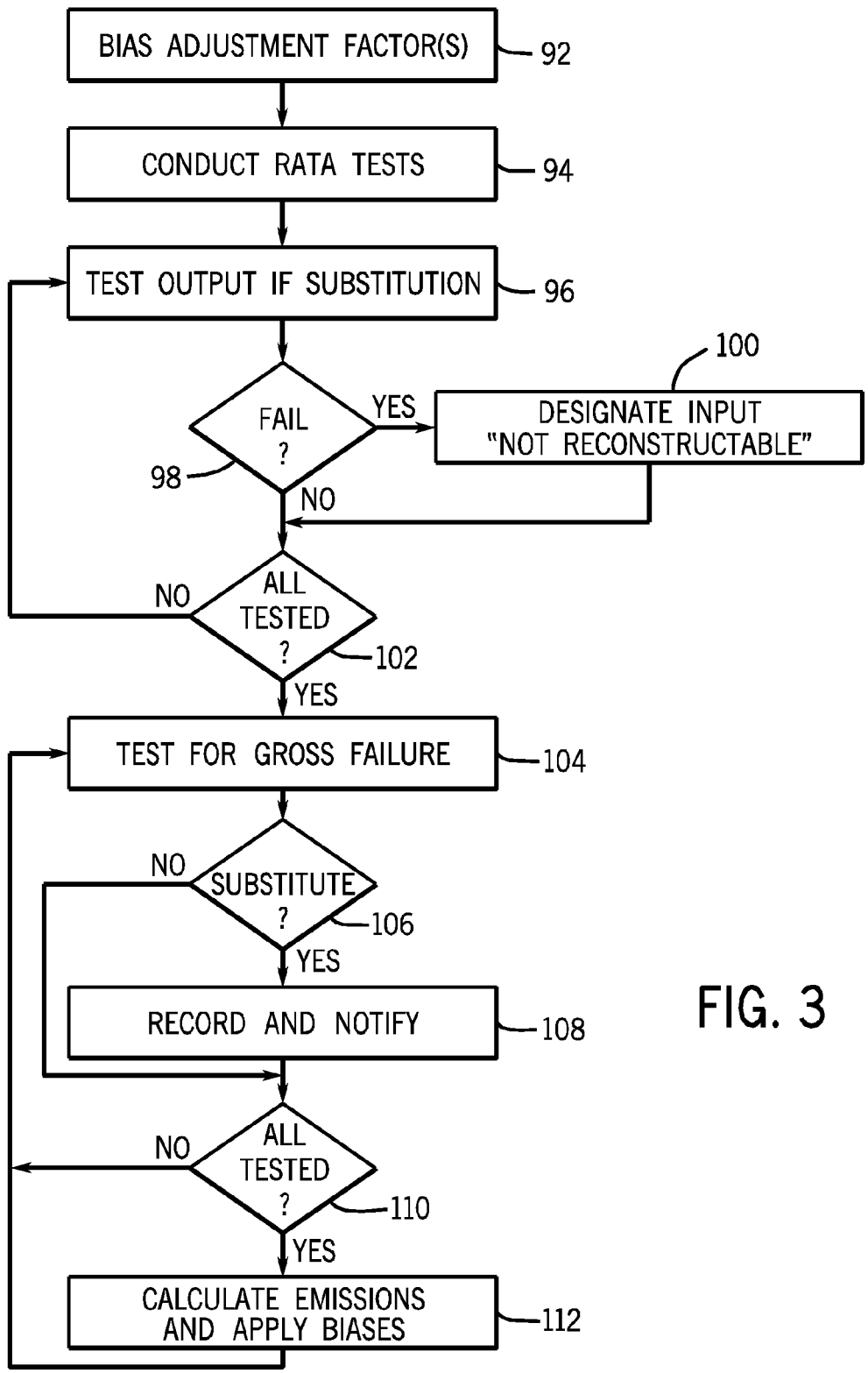
FIG. 3 is a flow chart illustrating exemplary logic for verifying sensor and modeled inputs and for replacement of modeled or reconstructed values where desired.

FIG. 3 is a flow chart illustrating exemplary logic for carrying out emissions model input verification and substitution in accordance with aspects of the present techniques. The logic may be defined in any suitable computer code that may be stored and executed on one or more computers including those of the plant control system and emission model as discussed above. Moreover, certain of the logic may be performed off-site with computations made by transfer of parameter values to remote monitoring and/or controlling computers, such as via the Internet. It should also be noted that that logic summarized in FIG. 3 is exemplary only, and other flows and processes may be employed in particular situations.

With the emissions model and the input prediction models established, at step 92 one or more biases may be established to adjust one or more of the modeled inputs and the emissions model outputs. This step may be performed prior to each verification of the system. Such verifications may take the form of a relative accuracy test audit or RATA that may be performed in accordance with PS-16. The specifications of PS-16 may be found in the United States Federal Register, vol. 74, no. 56, issued on Wednesday, Mar. 25, 2009, beginning on page 12575, which standard is hereby incorporated into a present disclosure by reference. As will be appreciated by those skilled in the art, such RATA tests verify compliance with the regulations, particularly in the modeling of emissions outputs and the accuracy of such modeling.

Figure 4:
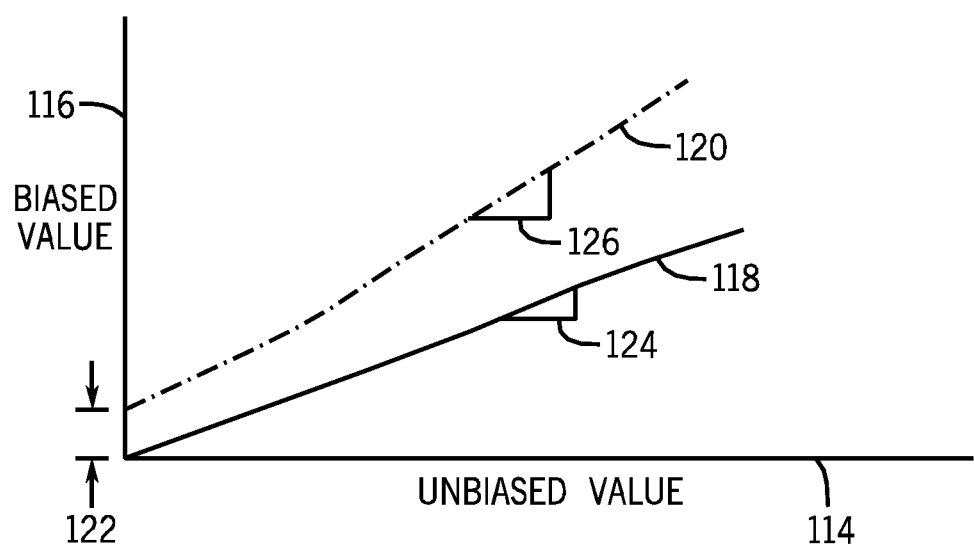
FIG. 4 is a graphical representation of an exemplary bias adjustment that can be made in input values or emissions model outputs.

The biasing performed at step 92 may consist of calculating bias adjustment factors for each modeled input value 56, 58 and 60 in FIG. 2, as well as for outputs of the emissions model as indicated by reference numerals 80 and 82 in FIG. 2. It should be noted that such adjustment factors may include offsets from the modeled values, changes in gains or slopes for the modeled values as a function of the inputs to the models, and both linear and/or non-linear changes in these values. FIG. 4 is a graphical illustration of an exemplary bias adjustment factor that may be employed. In FIG. 4, the unbiased value is represented along a horizontal axis 114 with a biased value along a vertical axis 116. Trace 118, then, represents a first bias scheme, whereas trace 120 represents a second. As illustrated, the bias adjustment may include an initial offset, as indicated by reference numeral 122, and each adjustment may have the same or a different slope as indicated by reference numerals 124 and 126. Moreover, if the bias adjustment is equal to unity, or equivalently, if no bias is used, the biased value will equal the unbiased value, or, that is, the output of the predictive model. The adjustment allows for more accurately adapting the model output to sensed values of the similar emissions model input and/or output values derived from sensed data. It should be noted that, while not illustrated in FIG. 4, one or more of the adjustments may be non-linear, fit to various data, or may include step-wise non-linarities.

At step 94, then, a RATA test is performed. Again, in a presently contemplated embodiment this test is performed in accordance with the specifications of PS-16, or any other rule or permit process currently or subsequently developed. The purpose of such tests is to determine the relative accuracy (RA) of the emissions model. That is, in general, the emissions model should produce modeled outputs that are within a desired range of the measured emissions levels as indicated by data collected from one or more sensors 36 (see FIG. 1). In the event of failure or loss of communication from one or these sensors, then, the process may continue in accordance with emissions standards by using the output of an accurate emissions model as verified by the RATA test. It should be noted, however, that while the embodiment described herein represents a PEMS that may be used as a "backup" to a hardware CEMS, such a PEMS may supplant the CEMS altogether, or in come applications a CEMS may not be deployed.

Following each RATA test, and following the nomenclature introduced in FIG. 2, an examination of the models is performed to determine the impact of a substitution of any one of the biased modeled input values $V''_n$ on the outcome of the RATA test (e.g., the value of any one of the biased emissions model outputs $E''_m$). As part of this process, and as indicated by step 96, all of the computations performed in the emissions model 34 (see FIG. 2) are carried out using a surrogate value $V''_n$ in lieu of a corresponding input value $E_n$. In the present implementation, only one such substitution is performed at a time to determine the impact of the substitution on the emissions model output. If any such substitution would cause the emission model to fail the RA test, that substitution will not be permitted and is deemed to be "unacceptable". Subsequently, if that same emissions model input $E_n$ becomes unavailable or is clearly erroneous, an indication will be provided that the emissions model input is "not reconstructable". This process is summarized in steps 98, 100 and 102 in FIG. 3. That is, at step 98 the logic determines whether any one of the substitutions caused a failure in the RATA analysis based upon a change that the substitution caused in the emissions model output. If such a failure is detected, the system indicates that, in the event that a particular input to the emissions model is unavailable or is clearly erroneous, the emissions model output that would utilize such inputs is not reconstructable, as indicated at step 100. The process continues as indicated at step 102 until all emissions model inputs that have modeled inputs surrogates have been tested for compliance with the acceptability criteria.

Following this acceptability testing, the system evaluates the emissions model inputs and the inputs to the input models as follows. As indicated at step 104, each value is tested for "gross failure". That is, each of the emissions prediction model inputs $E_n$ and each of the sensor validation model inputs $V_{np}$ is evaluated to determine whether a gross error has occurred in such inputs. Examples of gross errors may include, for example: (1) no data value is available from the data communication and storage system (e.g., the control system, one or more automation controllers, the data historian, etc.); (2) the sensor providing the data reports a fault condition; (3) the data value is outside of some tolerance criteria (e.g., a wet oxygen reading in a stack above 25%); and (4) a data value that is expected to show some variation over time has not changed in a defined time interval (e.g., the data value has "flatlined"). Other or different criteria may be used for such gross errors. If any emissions model input $E_n$ fails the gross error check at step 104 and none of the inputs to the corresponding sensor validation model on which the corresponding sensor validation value depends has failed the gross error check, a substitution may be made of the emissions model input $E_n$ with the corresponding bias-adjusted sensor validation model output $V''_n$. That is, as indicated in FIG. 2, a logical switch is available to accept one of the biased modeled inputs 68, 70 or 72 in lieu of the corresponding erroneous emissions model input 38, 40 and 42, respectively. During such re-calculation, bias factors are used that are appropriate for the calculation time. That is, if a re-calculation spans a RATA test, the "old" bias factors are used prior to the RATA test, while the "new" bias factors are used following the RATA test. In the logic of FIG. 3, then, at step 106 the system determines whether a substitution is to be made. If so, the substitution is recorded and notification is provided to the plant operators as indicated by step 108. Such notification may include audible or visible alarms, indications that one or more sensors needs servicing or to be changed, and so forth. Again, because these processes are preferably carried out cyclically during actual operation of the facility, such notification is timely and should lead to timely servicing of the sensors, communications media, and so forth. As indicated by block 110 in FIG. 3, then, the testing for gross failure continues until all values have been tested.

Following any needed substitution, or if no substitution is required, the emissions values are calculated at step 112 in a manner consistent with the emissions model. The emissions calculation outputs may then be biased as indicated above and reported and recorded for evaluation. In particular, should any of the actual emissions sensors fail to communicate or be unavailable, the modeled emissions output may be utilized as a surrogate.

Following the initial RATA test, if a gross failure is observed for any emissions model input that is not reconstructable or for which any of inputs 50, 52 or 54 (FIG. 2) to the corresponding input prediction model 44, 46, or 48 (FIG. 2) fails a gross error check, a fault is recorded in the system for that execution cycle. If more than one emissions model input fails the gross error check, a fault is recorded regardless of whether either of failing inputs is designated as not reconstructable. That is, in a present implementation, the substitution made at step 106 in FIG. 3 is permitted only if (1) no gross error is detected in any input to the particular emissions model input model (i.e., any $V_{np}$); (2) the biased modeled input value to be used as a surrogate would result in passing the RATA test (as indicated by steps 96-102 in FIGS. 3); and (3) no more than one substitution of a surrogate value is needed. In this embodiment, if more than one substitution is needed (i.e., more than one emissions model input is unavailable or clearly erroneous), the emissions model output is indicated as faulty.

In a presently contemplated embodiment, logic such as that summarized by blocks 92-102 may be carried out once following each RATA or RAA evaluation, while that of steps 104-112 may be carried out on each real-time or near real-time calculation cycle. The cyclic evaluation of the models, the input values, and the sensed parameters allows for timely notification of plant personnel in the event of a sensor failure or the inability to reconstruct emissions data or predications.

Regarding the particular steps and processes described above, several additional notes may be made. For example, regarding the predictions model for each emissions model input, preferred models may constitute a mass or energy-balance set, and if that is not possible, models my be built from correlated field points (but not mutually-correlated inputs). Moreover, some emissions model input models ($Y_1$, $Y_2 \ldots Y_n$) may use as inputs (50, 52 or 54) variables which themselves are emissions model inputs ($E_1$, $E_2 \ldots E_n$). The models ($Y_1$, $Y_2 \ldots Y_n$) may be linear or non-linear, and training set bounds will typically define the operating envelope of each model. Such training set data may include historical data, such as data stored in the data historian 32 discussed with reference to FIG. 1. In general, no such models will be made for ambient conditions, such as atmospheric humidity.

Regarding the bias adjustment factors, as noted above, these may be linear or non-linear, and may include offsets, slopes or gains, and so forth. Accordingly, in a linear example, the offset, in terms of the nomenclature used in FIG. 2 may be of the form:

$$V''_{ni} = (a_n \times V'_{ni}) + b_n$$

where $V''_{ni}$ is the biased modeled input value, $V'_{ni}$ is the unbiased model input value; $a_n$ is a slope or gain factor, and $b_n$ is an offset value. Alternatively, bias factors may be calculated for the input models based upon actual process data for a desired time period (e.g., several weeks) or the model may be rebuilt based upon such process data.

Regarding the determination of the impact of substitutions on emissions model accuracy, the RATA dataset (processed data and reference method emissions) is used to analyze an impact of the sensor reconstruction. For each row of the RATA data set, the reconstructed value $V''_n$ is unconditionally substituted for the corresponding value $E_n$. The predicted emissions for each row is then calculated based upon the bias-adjusted reconstructed values for the given emissions model input and the corresponding values for all other emissions model inputs. The RA is then calculated based on differences between the predicted emissions and the reference method emissions. Depending upon the outcome of the RA tests, that emissions model input is designated as reconstructable or not reconstructable. Any emissions model input for which there is no corresponding input model, such as ambient humidity, is always designated as not reconstructable.

Regarding the execution of the emissions model with the appropriately substituted inputs, as indicated at steps 106 through 112 of FIG. 3, the following methods may be employed for real-time calculations, re-calculations and priming. First, each of the emissions prediction model inputs $E_n$ may be tested and each of the sensor validation model inputs $V_{np}$ may be similarly tested for gross error as discussed with reference to step 104 in FIG. 3. Again, if any emissions model input $E_n$ fails the gross error test and none of the inputs to the sensor validation model on which the corresponding sensor validation output depends ($V_{n1}, V_{n2}, \ldots V_{np}$) failed a gross error test, the emissions model input $E_n$ may be permissibly replaced with the corresponding bias-adjusted sensor validation model output $V''_n$ if necessary. Again, records are kept for all such tests, and particularly for failures and incidences of the inability to reconstruct a model output.

It should also be noted that the present techniques allow for specification of the quality of the emissions model outputs based upon the result of the accuracy analysis. In a presently contemplated embodiment, at run time (including re-calculation and priming), a per-minute monitor reason code is set for the PEMS according to the following rules. If more than one emissions model input fails a gross error check, the monitor reason code is set to indicate that too many sensors have failed. If any emissions model input passes all gross error checks, but is outside the operating envelope of the emissions model as defined in PS-16, the monitor reason code is set to indicate that the model input is out of bounds. If one or more emissions model input that is designated "not reconstructable" fails a gross error check, the monitor reason code is set to indicate that a communication error occurred, a bounds error occurred, a value "flatlined", and so forth depending upon the type of gross error detected. If any emissions model input fails the gross error check and one or more of the model inputs on which the corresponding reconstructed value depends also fails a gross error check, the monitor reason code is set to indicate that the reconstruction failed. In all other cases, if none of the failure conditions is met, the monitor reason code is set to indicate that the modeling process is acceptable or good. It should be noted that the system may be adapted to prioritize such reason codes is multiple fault codes are detected at any particular time or cycle through the process.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A predictive emissions modeling method comprising:
    (a) determining whether an input value to an emissions prediction model that determines an emission level of a material transformation process based upon the input value or a modeled input value in place of the input value is in need of replacement, wherein the modeled input value is determined by an input prediction model based at least in part on an input;
    (b) when the input value is in need of replacement, determining whether the input value is replaceable by the modeled input value, wherein determining whether the input value is replaceable comprises:
        determining whether the emissions level computed with the modeled input value in place of the input value passes a relative accuracy test audit for the emissions prediction model;
        determining whether the inputs to the input prediction model has an error; and
        determining whether another input value to the emissions prediction model is in need of replacement,
        wherein the input value is replaceable by the modeled input value if the emissions level computed passes the relative accuracy test audit, the input to the input prediction model does not have an error, and no other input value is in need of replacement; and
    (c) when the input value is replaceable, computing the emission level via the emissions prediction model based upon the modeled input value by substituting the input value to the emissions prediction model that falls outside of an operating envelope with a reconstructed value for the input value which falls within the operating envelope with a programmed computing device and without manual intervention.

2. The method of claim 1, comprising modeling the input value and biasing the modeled input value, wherein the modeled input value evaluated in step (b) and used to compute the emission level in step (c) is the biased modeled input value.

3. The method of claim 2, wherein the biased modeled input value is biased based upon a comparison with a measured input value.

4. The method of claim 1, comprising biasing the computed emission level based upon a measured emission level.

5. The method of claim 1, comprising generating an operator notification if the input value is not replaceable.

6. The method of claim 1, comprising generating an operator notification if the emission level is computed via the emissions prediction model based upon the modeled input value.

7. The method of claim 1, comprising performing steps (a)-(c) repeatedly during the material transformation process.

8. A predictive emissions modeling method comprising:
    (a) determining which of a plurality of input values to an emissions prediction model that determines an emission level of a material transformation process based upon the plurality of input values or a modeled input value in place of a corresponding one of the input is reconstructable, wherein an input value is reconstructable if the emission level computed based upon the modeled input value in place passes a relative accuracy test audit for the emissions prediction model, wherein the modeled input value is determined by an input prediction model based on inputs;
    (b) determining whether one or more of the plurality of input values is in need of replacement; and
    (c) when only one input value is in need of replacement, the input value is reconstructable, and the inputs to the input prediction model that determines the corresponding modeled input value do not contain errors, replacing the input value that falls outside of an operating envelope with the modeled input value which falls within the operating envelope and computing the emission level via the emissions prediction model based upon the modeled input value with a programmed computing device and without manual intervention.

9. The method of claim 8, wherein the computation in step (c) is permitted only if only one modeled input value is utilized in lieu of a corresponding determined input value by the emissions prediction model.

10. The method of claim 8, comprising modeling the input values and biasing at least one of the modeled input values, wherein the modeled input values used to compute the emission level in step (c) is the biased modeled input value.

11. The method of claim 10, wherein the biased modeled input value is biased based upon a comparison with a measured input value.

12. The method of claim 8, comprising biasing the computed emission level based upon a measured emission level.

13. The method of claim 8, comprising generating an operator notification if the replacement of an input value by the respective modeled input value is not reconstructable.

14. The method of claim 8, comprising generating an operator notification if the emission level is computed via the emissions prediction model based upon any modeled input value.

15. A tangible non-transitory computer readable medium storing instructions executable by a processor of a computing device, the instructions configured to:
(a) determine whether an input value to an emissions prediction model that determines an emission level of a material transformation process based upon an input value or a modeled input value in place of the input value is in need of replacement, wherein the modeled input value is determined by an input prediction model based at least in part on an input;
(b) when the input value is in need of replacement, determine whether the input value is replaceable by the modeled input value, wherein the instruction to determine whether the input value is replaceable comprises instructions configured to, with a programmed computing device and without manual intervention:
determine whether the emissions level computed with the modeled input value in place of the input value passes a relative accuracy test audit for the emissions prediction model;
determine whether the input to the input prediction model has an error; and
determine whether another input value to the emissions prediction model is in need of replacement,
wherein the input value is replaceable by the modeled input value if the emissions level computed passes the relative accuracy test audit, the input to the input prediction model does not have an error, and no other input value is in need of replacement; and
(c) when the input value is replaceable, compute the emission level via the emissions prediction model based upon the modeled input value by substituting the input value to the emissions prediction model that falls outside of an operating envelope with a reconstructed value for the input value which falls within the operating envelope with the programmed computing device and without manual intervention.

16. The computer readable medium of claim 15, comprising instructions configured to generate an operator notification during performance of the material transformation process indicative of the use of a modeled input value in lieu of an input value for computing the emission level via the emissions prediction model, and/or that input value is not replaceable.

17. A tangible non-transitory computer readable medium storing instructions executable by a processor of a computing device, the instructions configured to:
(a) determine which of a plurality of input values to an emissions prediction model that determines an emission level of a material transformation process based upon the plurality of input values or a modeled input value in place of a corresponding one of the input values is reconstructable, wherein an input value is reconstructable if the emission level computed based upon the modeled input in place passes a relative accuracy test audit for the emissions prediction model, wherein the modeled input value is determined by an input prediction model based on inputs;
(b) determine whether one or more of the plurality of input values is in need of replacement; and
(c) when only one input value is in need of replacement, the input value is reconstructable, and the inputs to the input prediction model do not contain errors, replace the input value value that falls outside of an operating envelope with the modeled input value which falls within the operating envelope and compute the emission level via the emissions prediction model based upon the modeled input value with a programmed computing device and without manual intervention.

18. The computer readable medium of claim 17, comprising instructions configured to generate an operator notification during performance of the material transformation process indicative of the use of any modeled input value in lieu of a corresponding input value for computing the emission level via the emissions prediction model, and/or that an input value is not reconstructable.

* * * * *